US009470196B2

(12) United States Patent
Keeler

(10) Patent No.: US 9,470,196 B2
(45) Date of Patent: Oct. 18, 2016

(54) FUEL INJECTOR

(71) Applicant: DELPHI TECHNOLOGIES HOLDING, S.arl, Bascharage (LU)

(72) Inventor: Nathan Peter Keeler, Middlesex (GB)

(73) Assignee: Delphi International Operations Luxembourg SARL, Luxembourg (LU)

( * ) Notice: Subject to any disclaimer, the term of this patent is extended or adjusted under 35 U.S.C. 154(b) by 821 days.

(21) Appl. No.: 13/693,303

(22) Filed: Dec. 4, 2012

(65) Prior Publication Data
US 2013/0153686 A1 Jun. 20, 2013

(30) Foreign Application Priority Data
Dec. 14, 2011 (EP) .................... 11193480

(51) Int. Cl.
F02M 41/16 (2006.01)
F02M 61/10 (2006.01)
F02M 51/06 (2006.01)
F02M 53/04 (2006.01)
F02M 57/02 (2006.01)
F02M 47/02 (2006.01)
(Continued)

(52) U.S. Cl.
CPC ............. F02M 61/10 (2013.01); F02M 47/02 (2013.01); F02M 47/027 (2013.01); F02M 51/061 (2013.01); F02M 53/043 (2013.01); F02M 55/002 (2013.01); F02M 57/02 (2013.01); F02M 63/0054 (2013.01); F02M 63/0078 (2013.01); F16J 15/32 (2013.01); F02M 2200/04 (2013.01); Y10S 239/04 (2013.01)

(58) Field of Classification Search
CPC .... F02M 57/02; F02M 47/02; F02M 53/043; F02M 51/061; F02M 61/10; F02M 63/0054; F02M 63/0078; F02M 47/027; F02M 55/002; F02M 2200/04; F16J 15/32; Y10S 239/04
USPC ........... 239/88, 96, 124, 574, 585.1, DIG. 4; 251/900
See application file for complete search history.

(56) References Cited

U.S. PATENT DOCUMENTS 5,042,718 A * 8/1991 Bergmann ............. F02M 45/04
239/124
5,722,600 A 3/1998 Horiuchi
(Continued)

FOREIGN PATENT DOCUMENTS

BE 707157 5/1968
DE 1450671 3/1969
(Continued)

OTHER PUBLICATIONS

European Search Report dated Apr. 16, 2012.

Primary Examiner — Steven J Ganey
(74) Attorney, Agent, or Firm — Joshua M. Haines

(57) ABSTRACT

The present invention relates to a fuel injector for use in a fuel system of an internal combustion engine. The fuel injector has a supply passage for high pressure fuel and an injection nozzle. The injection nozzle includes a valve needle which can engage with a valve needle seating to control fuel delivery from the fuel injector. A first control valve is provided for controlling fuel pressure within a control chamber to control the valve needle. The fuel injector also includes a second control valve for controlling fuel pressure within a low pressure drain. The invention also relates to a control valve for controlling fuel pressure within a low pressure drain.

11 Claims, 5 Drawing Sheets

(51) Int. Cl.
  *F16J 15/32* (2016.01)
  *F02M 63/00* (2006.01)
  *F02M 55/00* (2006.01)

(56) References Cited

U.S. PATENT DOCUMENTS

| | | |
|---|---|---|
| 6,412,149 B1 | 7/2002 | Overberg |
| 2004/0000600 A1* | 1/2004 | Peters ............... F02M 47/025 239/88 |
| 2010/0282211 A1 | 11/2010 | Daniel et al. |

FOREIGN PATENT DOCUMENTS

| | | |
|---|---|---|
| DE | 102009036364 | 2/2010 |
| EP | 0753660 | 1/1997 |
| EP | 1923564 | 5/2008 |
| EP | 2249021 | 11/2010 |
| FR | 1165271 | 10/1958 |
| FR | 2596486 A1 | 10/1987 |
| JP | 2001073711 A | 3/2001 |
| JP | 2004048925 A | 2/2004 |
| JP | 2008045539 A | 2/2008 |

* cited by examiner

FUEL INJECTOR

TECHNICAL FIELD

The invention relates to a fuel injector for use in a fuel system of an internal combustion engine. For example, the invention relates to an injector suitable for use in a common rail fuel system having a common rail pump for supplying fuel to a common rail, which in turn supplies fuel to a plurality of injectors of the fuel system. Alternatively, the invention may relate to an injector for use in a unit injector fuel system where each injector has a dedicated pump.

BACKGROUND OF THE INVENTION

Known common rail fuel systems include an accumulator volume or common rail which is charged with fuel at high pressure by means of a high pressure fuel pump. Fuel at high pressure is supplied by the common rail to a plurality of injectors, each of which is arranged to inject fuel into an associated engine cylinder.

Each injector includes an injection nozzle having a valve needle which is spring biased towards a closed position in which it is seated against a valve needle seating. Injection is controlled by controlling fuel pressure (control pressure) in a control chamber by means of a two way nozzle control valve. The control chamber is at the back end of the valve needle and communicates continuously with a high pressure supply passage from the common rail.

The nozzle control valve is operable between an open position, in which the control chamber communicates with a low pressure drain, and a closed position in which communication between the control chamber and the drain is broken. In order to commence injection, the nozzle control valve is moved into its open position so as to open communication between the control chamber and the low pressure drain, thereby causing fuel pressure within the control chamber to be reduced and thus allowing the valve needle to lift from its seating. In order to terminate injection the nozzle control valve is moved into its closed position, closing communication between the control chamber and the low pressure drain. Due to the continuous flow of fuel into the control chamber, high fuel pressure is re-established within the control chamber, which causes the valve needle to be re-seated to terminate injection.

When the valve needle reaches its maximum lift position during injection, communication between the control chamber and the low pressure drain is inhibited substantially instantaneously. The abrupt termination of the spill flow from the control chamber into the low pressure drain can cause a collapsing cavity and/or pressure spike. The resulting local low pressure regions and reflected pressure waves may cause cavitation erosion, for example proximal the valve seat of the nozzle control valve. The operation of the nozzle control valve can also be affected.

To highlight the impact of the valve needle reaching its maximum lift position a fuel delivery gain curve C2 is shown in FIG. 1A and a fuel delivery stability curve C1 is shown in FIG. 1B. The fuel delivery gain curve C2 represents the fuel injected from the nozzle during injection. A non-linearity 'A' is evident on the gain curve approximately 800 μs from the actuation of the injector. The fuel delivery stability curve C1 shows a spike 'B' representing an increase in the shot to shot fuel delivery quantity instability that is coincident with the non-linearity 'A' on the fuel delivery gain curve C2. This coincident spike 'B' represents a non-linearity and instability which is the result of the abrupt termination of the spill flow from the control chamber into the low pressure drain when the nozzle valve needle reaches maximum lift 'C' causing a cavity to form behind the spill flow pulled by the fluid momentum of the flow within the spill drain. This low pressure cavity then collapses as the fluid flow reverses within the spill drain. At the point of cavity collapse a local high pressure is generated within the spill drain below the nozzle control valve (NCV) bottom seat. It is this local high pressure at the point of cavity collapse acting on the underside of the NCV valve pin affecting the motion of the nozzle control valve closure back onto the bottom seat causing the non-linearity.

It has been proposed to incorporate a restriction in the secondary drain line of prior art systems. A precisely sized orifice can restrict flow in and out of the area below the NCV bottom seat. However, this arrangement requires high precision geometry or flow conditioning within the spill port itself.

It is one object of the present invention to provide an improved fuel injector, suitable for use in common rail or unit injector type fuel systems, which overcomes or alleviates at least one of the aforementioned problems.

SUMMARY OF THE INVENTION

According to the present invention, there is provided a fuel injector for use in a fuel system for an internal combustion engine, the fuel injector comprising: a supply passage for high pressure fuel, an injection nozzle including a valve needle which is engageable with a valve needle seating to control fuel delivery from the injector, and a first control valve for controlling fuel pressure within a control chamber to control the valve needle; wherein the fuel injector further comprises a second control valve for controlling fuel pressure within a low pressure drain, the second control valve being a one-way valve. Providing a second control valve allows a physical seal to be created which can limit or suppress the formation of high pressure waves in the low pressure drain. The one-way valve can operatively isolate the low pressure drain of the fuel injector. For example, in an array comprising more than one fuel injector of the type described herein, the one-way valve associated with each fuel injector can operatively isolate the low pressure drain of that fuel injector from one or more other fuel injectors in the array. The second control valve can accommodate directionally biased flow rates.

The second control valve can be provided in the low pressure drain downstream of the first control valve. The second control valve can be provided below a bottom seat of the first control valve. The second control valve can be provided at an exit port through which fuel is drained from the fuel injector. The second control valve can at least substantially seal the exit port. An exit port can be provided in the second control valve.

The supply passage can be in communication with the control chamber through a first flow path. The communication between the supply passage and the control chamber can be continuous.

The fuel injector can have a second flow path to provide communication selectively between (i) the supply passage and the control chamber; or (ii) between the control chamber and the low pressure drain. The operative flow path is determined by the position of the first control valve.

The first control valve can have first and second operating positions. In a first operating position, the supply passage can communicate with the control chamber through a supplementary flow means by permitting fuel flow past the control valve seat. The communication between the control chamber and the low pressure drain through the second flow path is prevented when the first control valve is in said first operating position.

The first control valve can have a second operating position in which the control chamber communicates with the low pressure drain through the second flow path. The communication between the supply passage and the control chamber through the supplementary flow means can be prevented when the first control valve is in the second operating position.

The second control valve can be operable to maintain a positive pressure within the low pressure drain. The second control valve can maintain a positive pressure when the second control valve is in said second operating position.

The one-way valve can be associated exclusively with said fuel injector. The one-way valve can be integrated into said fuel injector, for example forming part of a valve body of the fuel injector.

The first control valve can comprise a first control valve member and a first control valve seat.

The second control valve can comprise a second control valve member and a second control valve seat. The second control valve member can co-operate with the second control valve seat to control the fuel pressure in the low pressure drain.

The second control valve member can be a resilient member biased towards the second control valve seat to close the second control valve. In use, the pressure of fuel in the low pressure drain must overcome the bias of the resilient valve member to open the second control valve. If the pressure in the low pressure drain falls to a level which is not sufficient to displace the resilient valve member, the second control valve closes at least substantially sealing the low pressure drain. The second control valve member can be made of a resilient material, for example an elastomer, rubber, nitrile, or Viton®.

The second control valve member can comprise an O-ring. Alternatively, the second control valve member can comprise a C-clip, for example made of spring steel.

The second control valve can comprise an annular recess for retaining the second control valve member. The exit port can be formed in the annular recess. The second control valve member can partially or completely overlie the exit port. The exit port can be defined by a radial aperture in communication with the low pressure drain.

The second control valve can comprise a biasing means to bias the second control valve member towards the second control valve seat to close the second control valve. The biasing means can comprise a resilient member, such as a spring. The second control valve member can be, for example, a ball valve. The second control valve member can be inflexible or rigid. A second control valve seat can be defined for receiving the second control valve member. The pressure of fuel in the low pressure drain can overcome the biasing means to unseat the second control valve member, thereby opening the second control valve.

The injector can be provided with a means for breaking communication between the control chamber and the low pressure drain through the second flow path when the valve needle has moved away from its seating by a predetermined amount, thereby to limit the loss of pressurized fuel between the control chamber and the low pressure drain during injection.

For example, the valve needle can be configured so as to break communication between the control chamber and the low pressure drain through the second restricted flow path when it is moved away from its seating by a predetermined amount, for example at maximum lift.

The second flow path can define an entry port in communication with the control chamber, wherein a further surface associated with the valve needle covers the entry port at maximum needle lift. Typically, for example, the valve needle may include a separate end piece defining the further surface for covering the entry port.

In an alternative embodiment, the valve needle and the end piece for covering the entry port may be integrally formed together.

The fuel injector may include a first and/or second control valve in the form of an electromagnetically actuable valve or a piezoelectrically actuable valve. The first and/or second control valve member can be spring-biased closed.

The injector may form part of a common rail fuel system including a common rail pump supplying a common rail (i.e. an accumulator volume for high pressure fuel), in which the common rail supplies fuel to at least one injector of the system.

In an alternative embodiment, the injector may form part of a unit injector system in which a dedicated pump supplies pressurized fuel to an associated injector of the same unit, but to no other injectors of the system. The dedicated pump and the injector may form part of an injector/pump unit or, alternatively, the dedicated pump may be spaced remotely from its associated injector by means of a high pressure fuel line.

The injector is also appropriate for use in fuel systems of the hybrid common-rail/unit injector type. In systems of this type each injector has an associated pump, which is able to supply fuel directly to the associated injector or to a common rail supplying fuel to one or more other injectors of the system also.

According to a further aspect, the present invention provides a control valve for controlling fuel pressure in a low pressure drain of a fuel injector for an internal combustion engine, the control valve comprising a valve member and a valve seat; wherein the valve member is biased towards the valve seat to close the control valve. The pressure of fuel in the low pressure drain can deform the valve member to open the control valve. The control valve can have an exit port associated with the control valve seat.

The valve member can consist of a resilient O-ring or C-clip for cooperating with the valve seat. The O-ring or C-clip can be located in an annular recess formed in the control valve.

Alternatively, a biasing means can be provided to bias the valve member towards the valve seat to close the control valve. The valve member can be a ball valve, for example.

The control valve can comprise a valve body. The valve member can be provided around at least a portion of the outside of the valve body. A control chamber can be provided in the valve body for controlling actuation of a needle valve. In operation, the needle valve may travel along a longitudinal axis of the valve body. A portion of the needle may enter the control chamber when the control valve is in use.

According to a still further aspect, the present invention provides a one-way valve comprising a C-clip for controlling fluid flow through an aperture. The C-clip can be arranged to open and close a fluid pathway in response to pressure changes. For example, the C-clip can extend over the aperture to control the flow of fluid through said aperture. The C-clip can permit fluid flow through said aperture in only one direction. The C-clip can be formed from a resilient material to bias the one-way valve to a closed position (i.e. at least partially obstructing the aperture). The C-clip can, for example, be made of spring steel. The one-way valve is suitable for use in fuel injection systems.

Within the scope of this application it is expressly intended that the various aspects, embodiments, examples and alternatives set out in the preceding paragraphs, in the claims and/or in the following description and drawings, and in particular the individual features thereof, may be taken independently or in any combination. For example, features described with reference to one embodiment are applicable to all embodiments, unless such features are incompatible.

BRIEF DESCRIPTION OF THE DRAWINGS

The invention will now be described, by way of example only, with reference to the accompanying drawings in which.

DETAILED DESCRIPTION OF AN EMBODIMENT

Figure 1A:
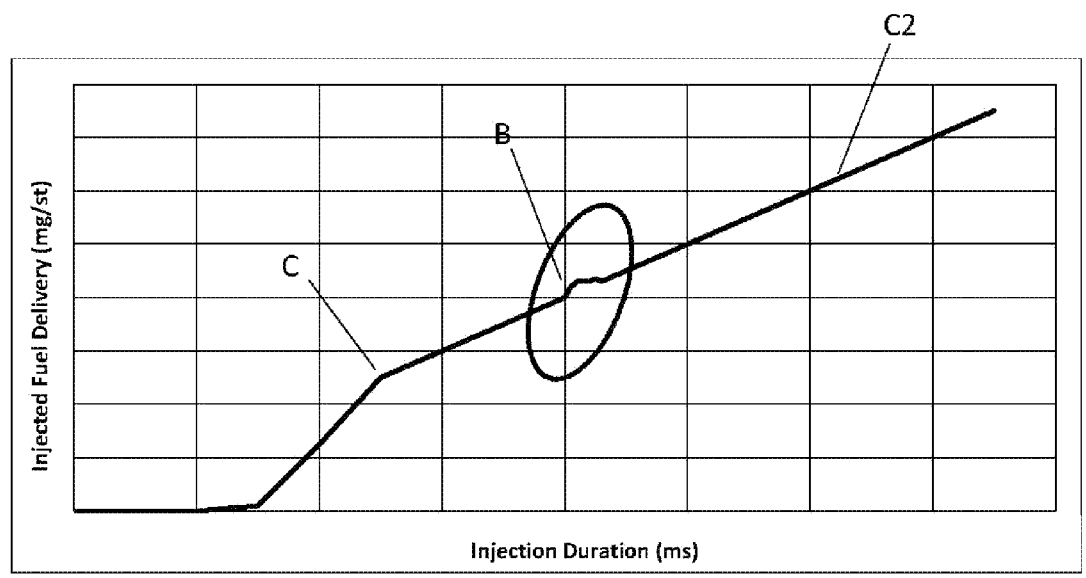
FIGS. 1A and 1B respectively show a fuel gain curve and a fuel delivery stability curve for a prior art fuel injector.
Figure 1B:
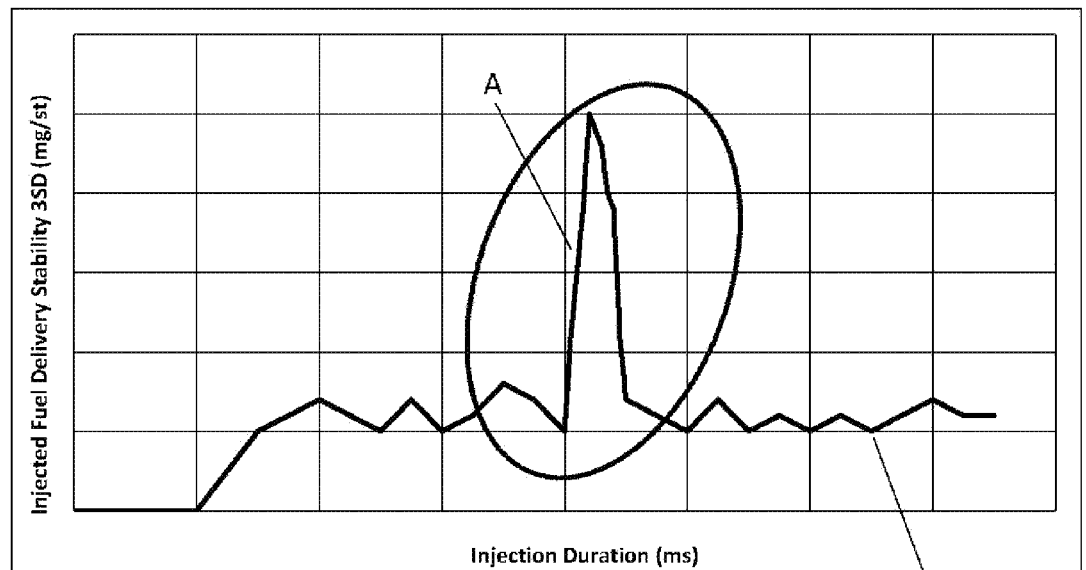
Figure 2:
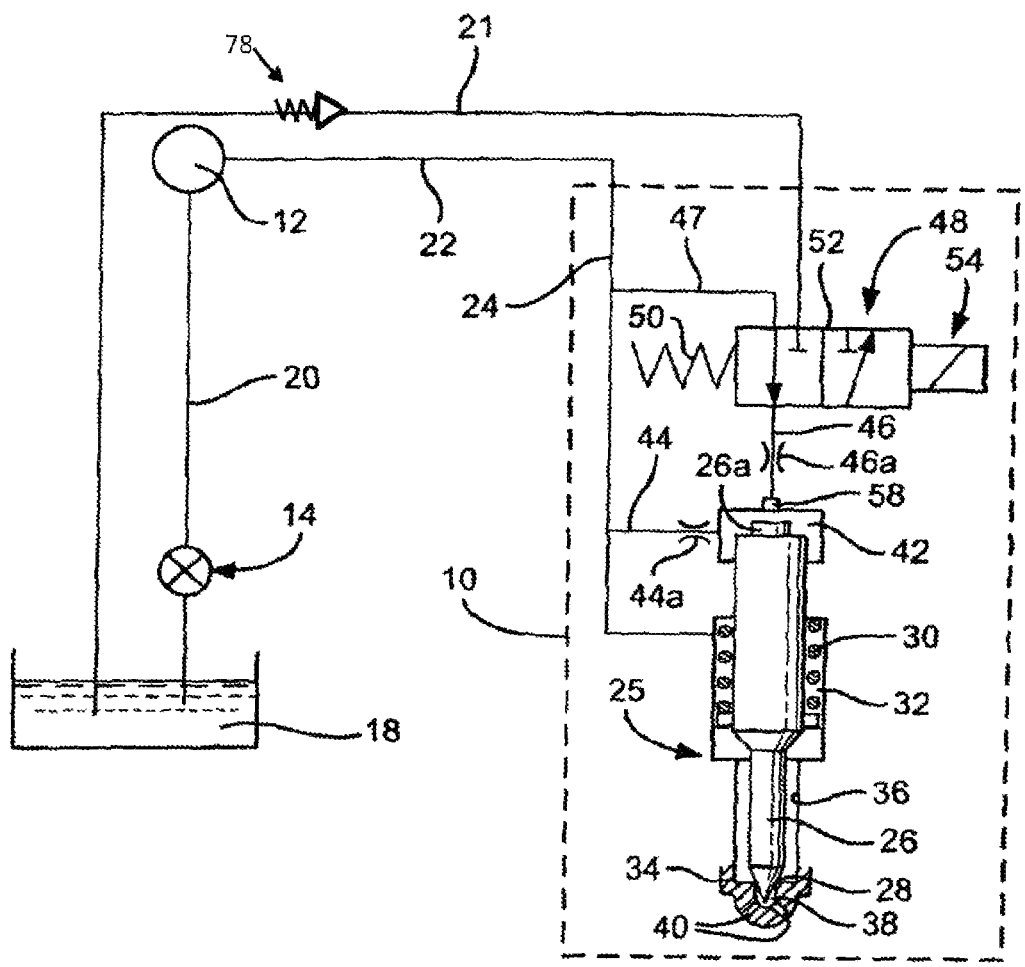
FIG. 2 is a schematic diagram of a first embodiment of the fuel injector when in a first operating condition.

Referring to FIG. 2, a fuel system for a compression ignition internal combustion engine includes a fuel injector (within the dashed line 10) of a first embodiment of the present invention. The injector 10 is arranged to receive high pressure fuel from an accumulator volume or common rail 12, which is charged with fuel at high pressure by means of a high pressure fuel pump 14, typically to a pressure level of around 400-3000 bar. The fuel pump 14 receives fuel at relatively low pressure from a low pressure fuel reservoir or drain 18 and delivers pressurized fuel to the common rail 12 through a first delivery line or flow path 20. The common rail 12 supplies fuel at high pressure (referred to as "supply pressure") through a second delivery line or flow path 22, which in turn is arranged to deliver fuel to a supply passage 24 of the associated injector 10. A return line 21 is provided between the injector 10 and the low pressure drain 18.

In practice, the fuel system includes a plurality of fuel injectors similar to the injector 10, with one injector being provided for each engine cylinder of the associated engine. Each of the injectors of the system is arranged to receive fuel at high pressure from the common rail 12 and operates in the same manner as the other injectors. Therefore, for the purpose of the following description, only one injector 10 of the system will be described.

The injector 10 includes an injection nozzle 25 having a valve needle 26, which is urged towards a valve needle seating 28 by means of a valve needle spring 30 housed within a spring chamber 32. The injection nozzle 25 includes a nozzle body 34 (only a lower end portion of which is indicated) provided with a blind bore 36 within which the valve needle 26 is movable. The spring chamber 32 is defined at the upper end of the nozzle bore 36 and both the chamber 32 and the bore 36 receive high pressure fuel from the injector supply passage 24. The valve needle 26 has upwardly directed thrust surfaces exposed to fuel pressure within the bore 36 and the spring chamber 32, and said fuel pressure causes an upward force to be applied the valve needle 26 which acts in a valve needle opening direction.

The valve needle 26 is movable into and out of engagement with the valve needle seating 28 to control whether fuel delivered to the nozzle bore 36 is able to flow past the valve needle seating 28 and into a sac volume 38 defined at the blind end of the bore 36. The sac volume 38 communicates with a plurality of outlet openings 40 (two of which are shown) provided in the nozzle body 34, so that when the valve needle 26 is moved away from the valve needle seating 28 and fuel flows into the sac volume 38, an injection of fuel occurs through the outlets 40 into the associated combustion space.

At the end of the valve needle 26 remote from the valve needle seating 28, an end surface of the valve needle 26 is exposed to fuel pressure within a control chamber 42. Fuel pressure within the control chamber 42 acts in combination with the valve needle spring force to urge the valve needle 26 against the seating 28.

In another embodiment, the valve needle may be coupled to a needle piston so that it is a surface of the needle piston that is exposed to fuel pressure within the control chamber 42, and not a surface of the valve needle 26.

There are two possible flow paths for fuel into the control chamber 42 from the supply passage 24. A first control chamber filling path in the form of a first flow path 44 is provided between the injector supply passage 24 and the control chamber 42. The first flow path 44 permits a continuous flow of fuel into the control chamber 42 at a restricted rate, as determined by a first restriction or orifice 44a in the path 44. A supplementary control chamber filling path is provided by a supplementary flow path 47 and a second restricted flow path 46. The second flow path 46 has a second restriction or orifice 46a which determines the flow rate through this second flow path 46. The supplementary control chamber filling path 47, 46 is able to supply high pressure fuel to the control chamber 42 under the control of a nozzle control valve 48.

The nozzle control valve 48 takes the form of a three-way control valve 48, which is operable between open and closed positions to determine whether the second restricted flow path 46, and hence the control chamber 42, communicates with the supplementary flow path 47 from the supply passage 24 or with the return line 21. The nozzle control valve 48 includes a nozzle control valve member 52 and a control valve spring 50, which serves to bias the nozzle control valve member 52 into the closed position. When the nozzle control valve is in the closed position, communication between the control chamber 42 and the return line 21, via the second restricted flow path 46, is broken, and instead the control chamber 42 communicates with the supply passage 24 through the supplementary flow path 47 and the second flow path 46. Therefore, in circumstances in which the nozzle control valve 48 is in the closed position, there is a supplementary control chamber filling means (in addition to the first flow path 44) between the injector supply passage 24 and the control chamber 42 by virtue of the supplementary flow path 47 communicating with the second restricted flow path 46.

An electromagnetic actuator, identified generally by 54, is operable to move the nozzle control valve member 52 into the open position, against the control valve spring force. When the nozzle control valve 48 is in the open position, the control chamber 42 communicates with the return line 21 via the second restricted flow path 46, and communication between the control chamber 42 and the supply passage 24 through the additional filling flow path 47, 46 is prevented.

The electromagnetic actuator 54 is of conventional type and includes an energizable winding (not shown in FIGS. 2 and 3) through which a current is supplied when it is required to open the nozzle control valve 48 to commence injection, as discussed further below. The second restricted flow path 46 has an entry port or opening 58 to the control chamber 42. At its upper end, the valve needle 26 is provided with a reduced diameter end piece 26a, which is co-operable with the entry port 58 in circumstances in which the valve needle 26 is moved away from its seating 28 through a predetermined amount, being its maximum extent of travel ("maximum lift"). Co-operation between the end piece 26a of the valve needle and the entry port 58 of the second flow path 46 provides a means of reducing loss of high pressure fuel from the control chamber 42 during an injection event.

Figure 4:
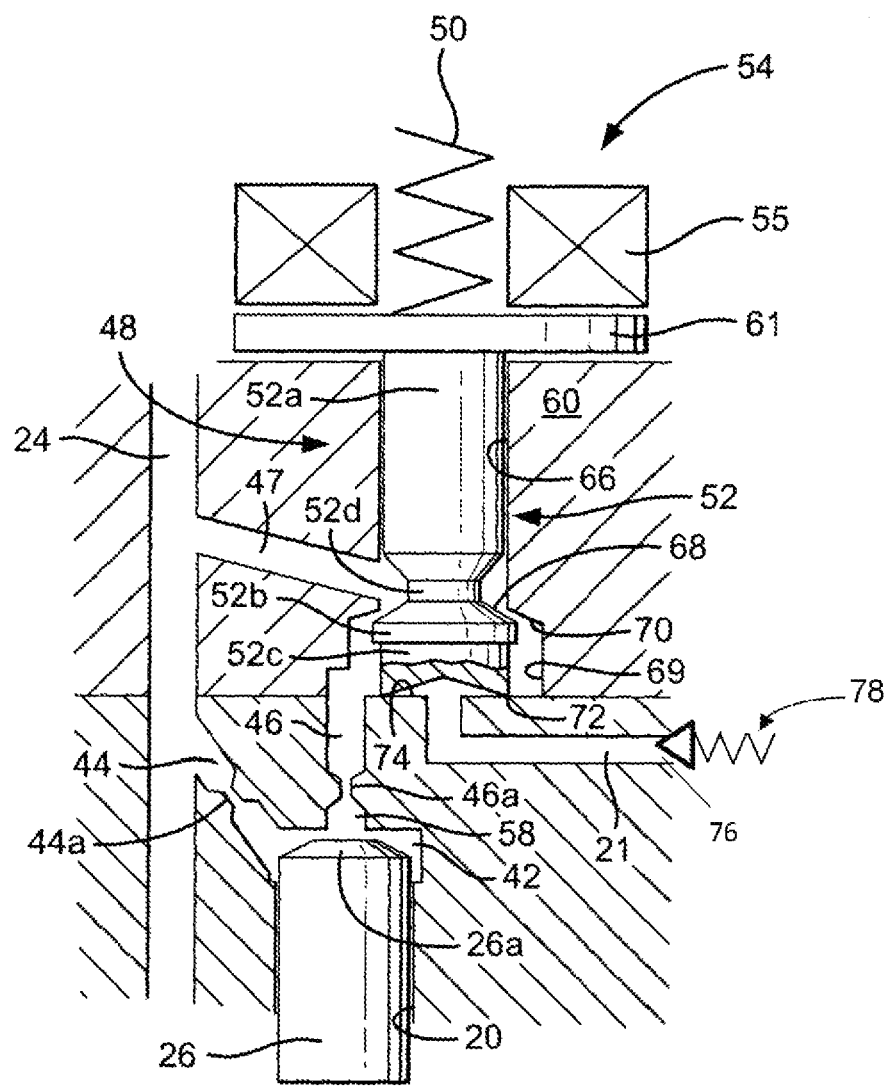
FIG. 4 shows one embodiment of a three-way nozzle control valve forming part of the fuel injector in FIGS. 2 and 3.

The return line 21 defines an exit port 76, as shown in FIG. 4. A return control valve 78 is provided at the exit port 76 for controlling the fuel pressure in the return line 21. The return control valve 78 is a one-way valve which maintains a positive pressure in the return line 21 to suppress pressure waves which may be created when the valve needle 26 reaches its maximum lift position. A practical implementation of the return control valve 78 is described below with reference to FIG. 4.

Operation of the fuel system so as to provide an injection of the fuel through the outlets 40 will now be described in detail. In the position shown in FIG. 2, the nozzle control valve 48 is in the closed position and there is a supply of high pressure fuel into the control chamber 42 through both the first restricted flow path 44 and the second restricted flow path 46, due to the second restricted flow path 46 communicating with the supplementary flow path 47. In the nozzle control valve closed position, communication between the control chamber 42 and the return line 21, via the second restricted flow path 46, is broken. High fuel pressure within the control chamber 42 acts in combination with the force of the valve needle spring 30 and serves to urge the valve needle 26 into engagement with its seating 28 to prevent injection through the outlet openings 40. This is the non-injecting state of the fuel injector.

When it is required to commence injection, the actuator 54 is energized to move the nozzle control valve 48 into its open position against the force of the control valve spring 50. Opening of the nozzle control valve 48 closes communication between the injector supply passage 24 and the control chamber 42 through the second restricted flow path 46 and opens communication between the control chamber 42 and the return line 21 through the second restricted flow path 46. In such circumstances, fuel within the control chamber 42 is able to flow from the control chamber 42, through the second restricted flow path 46 to the return line 21 and, hence, to low pressure. In this operating condition, the second restricted flow path 46, the lower seat 74 and the return line 21 therefore define a return flow path for fuel between the control chamber 42 and the low pressure drain 18.

Figure 3:
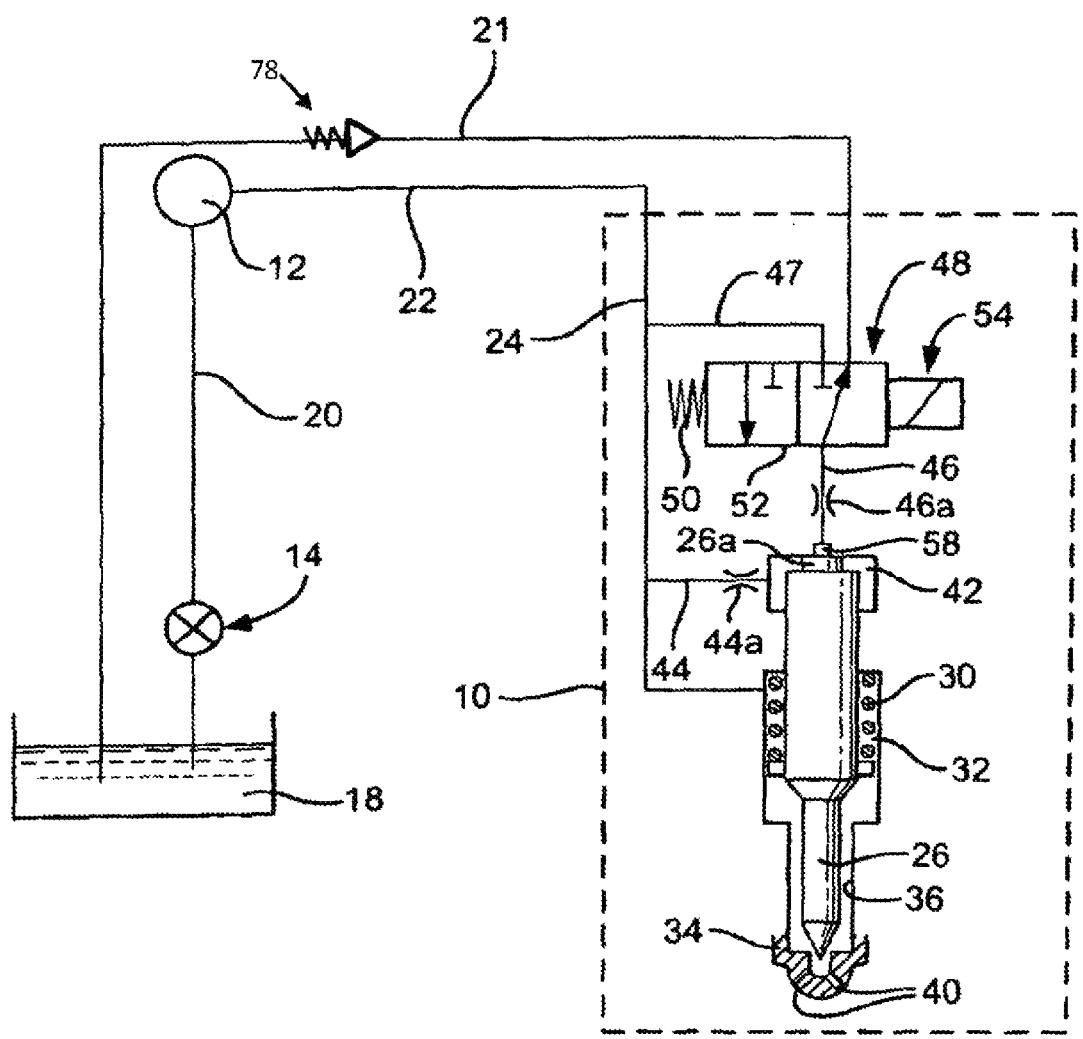
FIG. 3 illustrates the fuel injector in FIG. 2 when in a second operating condition.

As fuel pressure within the control chamber 42 is reduced, the closing force acting on the upper end of the valve needle 26 is reduced. As a consequence, the valve needle 26 is caused to move away from its seating 28 due to high fuel pressure delivered to the nozzle bore 36 acting on the injector thrust surfaces in the valve needle opening direction. Fuel is therefore able to flow into the sac volume 38 and, hence, through the outlet openings 40 into the engine cylinder. This is the injecting state of the fuel system, as shown in FIG. 3.

During the injection phase, fuel pressure within the control chamber 42 will drop to an intermediate level between low pressure (i.e. drain pressure) and supply pressure (i.e. pressure within the supply passage 24). The level to which fuel pressure within the control chamber 42 is reduced is determined by the ratio of the flow areas presented by the first restriction 44a in the first flow path 44 (through which fuel flows into the control chamber 42) and the restriction 46a in the second flow path 46 (through which fuel flows to low pressure). The first and second restrictions 44a, 46a are sized to ensure that, when the nozzle control valve 48 is open, pressure in the control chamber 42 is allowed to reduce at least to a level (the threshold pressure level) which, in combination with the valve needle spring force, is overcome by the upwardly directed forces acting on the valve needle 26. Thus, at some time after the nozzle control valve 48 has moved into its open position, the valve needle 26 will lift away from its seating 28 to allow injection to commence. Once pressure in the control chamber 42 drops to the threshold pressure level, the rate at which fuel pressure within the control chamber 42 is reduced further determines the rate at which the valve needle 26 is caused to lift away from its seating.

When the valve needle 26 is at maximum lift, the end piece of the valve needle 26 covers the entry port 58. Once this has happened, fuel pressure within the control chamber 42 will start to increase due to the continuous flow of fuel into the control chamber 42 through the first flow path 44, 44a. However, as an area of the end piece of the valve needle 26 is exposed to low pressure at the entry port 58, only a reduced surface area of the end of the valve needle 26 is exposed to pressure in the control chamber 42. Thus, as the nozzle bore 36 continues to be supplied with fuel at supply pressure, the valve needle 26 is maintained in its lifted position.

To terminate injection, the nozzle control valve 48 is returned to its closed position by de-energizing the actuator winding. Closing the nozzle control valve 48 closes communication between the control chamber 42 and the return line 21 via the second restricted flow path 46 and instead opens communication between the supplementary flow path 47 and the second restricted flow path 46 so that fuel is able to flow into control chamber 42 through the nozzle control valve 48. High pressure is therefore re-established within the control chamber 42 due to the flow of fuel through the first flow path 44 (which is continuous) and the additional flow of fuel through the second flow path 47, 46. With high fuel pressure re-established in the control chamber 42 the valve needle 26 is essentially pressure balanced, and the valve needle spring 30 therefore serves to urge the valve needle 26 against the valve needle seating 28 to terminate injection.

The characteristics of the injector 10, for example injection timing (e.g. relative to pumping), rate of movement of the valve needle 26 and fuel delivery quantity can be optimized by careful selection of the flow areas of the restrictions 44a, 46a in the first and second flow paths 44, 46, the pre-load of the valve needle spring 30 and the diameter of the valve needle seating 28.

The injector 10 is preferably formed such that the injection nozzle 25 and the nozzle control valve 48 form part of the same injector unit 10. By way of example, FIG. 4 shows one practical embodiment of a part of the injector 10 shown in FIGS. 2 and 3. Similar parts to those shown in FIGS. 2 and 3 have been referred to with like reference numerals for ease of reference.

The actuator 54 includes an electromagnetic winding 55, a spring 50 (as shown in FIGS. 2 and 3) and an armature 61 which is actuable in response to energization and de-energization of the winding 55. It should be noted that one difference between the embodiment of FIGS. 2 and 3 and the embodiment in FIG. 4 is that in FIGS. 2 and 3 the actuator 54 is of the 'energize-to-push' type (i.e. energizing the winding of the actuator causes the nozzle control valve member to be pushed against the spring force 50), whereas in FIG. 4 the actuator 54 is of the 'energize-to-pull' type.

The nozzle control valve member 52 is coupled to the armature 61. As shown in FIG. 4, the upper valve housing 60 is provided with a first valve housing bore 66. The nozzle control valve member 52 includes an upper guide region 52a, being that region coupled to the armature 61, a seating region 52b having an upper frusto-conical surface and a lower region 52c. A valve neck 52d separates the upper guide region 52a from the seating region 52b. The upper guide region 52a is guided for movement within the first valve housing bore. The seating region 52b of the nozzle control valve member 52 includes an upper seating surface 68 which is defined on the upper frusto-conical surface. A region of the valve housing bore 66 is shaped to define an upper valve seat 70 for engagement with the upper seating surface 68 of the nozzle control valve member 52 when in its open position.

The lower region 52c of the nozzle control valve member 52 is not guided, but moves within an enlarged diameter bore region 69 provided in the valve housing 60. The diameters of the upper guide region 52a and the lower region 52c of the valve member 52 are substantially equal. The nozzle control valve member 52 also includes an enlarged diameter collar 52b which is integrally formed with the rest of the valve member 52. A valve neck 52d separates the collar 52b from the upper guide region 52a. The collar 52b includes a frusto-conical surface which defines the upper seating surface 68. The diameter of the upper seating surface 68 against the upper valve seat 70 is substantially equal to the diameters of the upper guide region 52a and the lower region 52c. The lower seating surface 72 is defined by an end surface of the lower valve region 52c. The lower seating surface is engageable with a flat, lower valve seat 74 defined by an upper surface of the nozzle body 34.

Figure 5:
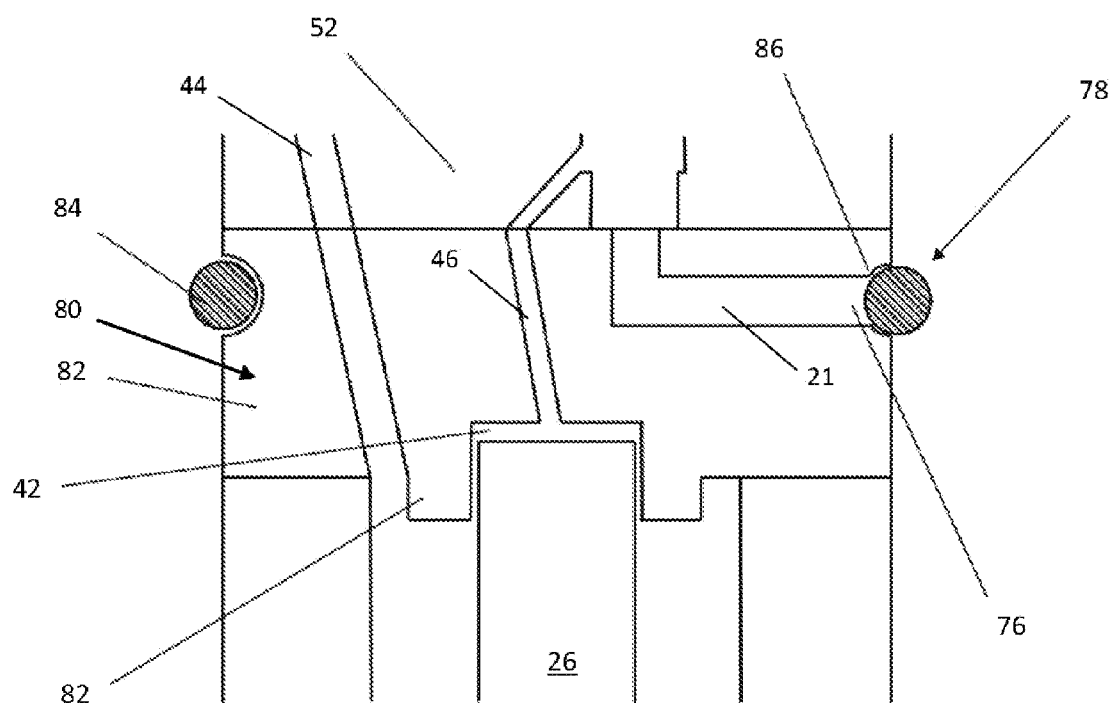
FIG. 5 shows a cross-section of a return control valve for controlling the low pressure drain of the fuel injector shown in FIGS. 2, 3 and 4.

As shown in FIG. 4, the return control valve 78 is positioned over the exit port 76 to control the pressure in the return line 21. As shown in FIG. 5, the return control valve 78 comprises a valve body 80 with a cylindrical section 82, and an O-ring 84 for positioning over the exit port 76 to form a partial seal. The O-ring 84 is located in an annular recess 86 in the valve body 80 and covers the exit port 76. The O-ring 84 is formed from a resilient material, such as rubber or Nitrile, and is biased to a closed position in which the exit port 76 is closed. The exit port 76 comprises a radial bore formed in the return control valve body 80 which communicates, when the nozzle control valve member 48 is energized, with the control chamber 42 formed in an interior of the cylindrical section 82 which is open to the return line 21. The exit port 76 may have a frusto-conical opening (not shown) to help reduce wear on the O-ring 84.

The nozzle control valve member 52 is biased by means of the spring 50 into the closed position (downwards in the orientation shown) in which its lower seating surface 72 is in engagement with the lower valve seat 74. In such circumstances, fuel is able to flow from the injector supply passage 24, through the supplementary flow path 47, past the exposed upper valve seat 70 and through the second restricted flow path 46 to the control chamber 42. In addition to the flow of fuel through this flow path 47, 46, fuel at supply pressure is also able to flow into the control chamber 42 through the first restricted flow path 44. This is the stage of the injection cycle in which the valve needle 26 is seated and injection does not take place due to high fuel pressure within the control chamber 42.

In order to open the nozzle control valve 48, the actuator winding 55 is energized to cause the seating region 52a of the nozzle control valve member 52 to move away from the lower valve seat 74 into engagement with the upper valve seat 70. In such circumstances, communication between the supplementary flow path 47 and the second restricted flow path 46 is broken and instead communication is established between the control chamber 42 and the return line 21 through the second restricted flow path 46 and the valve drilling 76. Fuel within the control chamber 42 escapes to low pressure through the second restricted flow path 46 at a greater rate than fuel flows into the control chamber 42 through the first restricted flow path 44 and, hence, the valve needle 26 is caused to lift from its seating. During this stage of operation, fuel pressure within the control chamber 42 drops to an intermediate level between supply pressure and drain pressure.

A positive fuel pressure within the return line 21 deforms the O-ring 84 outwardly, thereby opening the return control valve 78 to allow fuel to exit through the exit port 76. A reduction in the fuel pressure within the return line 21, for example caused by the valve needle 26 reaching its maximum lift position, allows the O-ring 84 to return to its un-deformed state, thereby closing the return control valve 78 and inhibiting the flow of fuel through the exit port 76. Importantly, the presence of the O-ring 84 will tend to retain a positive pressure upstream, i.e. on the nozzle control valve side, of the exit port 76. This operation, with the return control valve 78 acting as a Pressure Maintaining Valve, will tend to prevent any cavities forming in this region and hence prevent the undesirable pressure spikes described above. Any further reduction in the pressure in the return line 21 will enhance the seal made by the O-ring 84. The return control valve 78 thereby functions as a one-way valve allowing fuel to exit through the exit port 76 and preventing fuel from being drawn back into the return line 21.

The return control valve 78 maintains a positive pressure below the valve member 52, thereby preventing or suppressing any cavity forming and hence preventing any pressure spike which might otherwise occur, for example, upon collapse of a low pressure cavity formed when the valve needle 26 reaches its maximum lift position. The return control valve 78 can thereby prevent or suppress localized high pressure in the return line 21 below the lower valve seat 74. Thus, the seating of the nozzle control valve member 52 in the lower valve seat 74 may be substantially unaffected by pressure variations in the return line 21 and a substantially linear fuel injection can be achieved (i.e. the non-linearity observed in the prior art systems can be partially or completely inhibited). By suppressing local low pressure regions and limiting the amplitude of any reflected pressure waves, the return control valve 78 can reduce or prevent cavitation erosion for example of the lower valve seat 74.

It will be appreciated that various changes and modifications can be made to the fuel injector 10 described herein without departing from the scope of the present invention.

Optionally, the diameters of the regions 52*a*, 52*c* may be adjusted (i.e. so that they are different), either to bias the valve open or to bias the valve closed.

As an alternative to providing an electromagnetic actuator to control the nozzle control valve, another type of actuator may be used, for example a piezoelectric actuator.

The fuel injector 10 described herein includes first and second restrictions 44*a*, 46*a* in the first and second restricted flow paths 44, 46 respectively. However, these are not essential to the operation of the invention described herein and one or both of the restrictions 44*a*, 46*a* could be omitted from the fuel injector 10. Likewise, the invention can be embodied in fuel injectors which do not include a supplementary flow path 47.

An actuator could be provided for controlling operation of the return control valve 78.

The invention claimed is:

1. A fuel injector for use in a fuel system for an internal combustion engine, the fuel injector comprising:
   a supply passage for high pressure fuel,
   an injection nozzle including a valve needle which is engageable with a valve needle seating to control fuel delivery from the injector,
   a first control valve for controlling fuel pressure within a control chamber to control the valve needle, and
   a second control valve for controlling fuel pressure within a low pressure drain, the second control valve being a one-way valve;
   wherein the first control valve selectively permits fuel flow from the control chamber through the second control valve and also selectively prevents fuel flow from the control chamber through the second control valve.

2. A fuel injector as claimed in claim 1, wherein the second control valve is operable to maintain a positive pressure within the low pressure drain.

3. A fuel injector as claimed in claim 1, wherein the second control valve comprises a second control valve member co-operable with a second control valve seat at least substantially to seal the low pressure drain.

4. A fuel injector as claimed in claim 3, wherein the second control valve member is a resilient member and is biased towards the second control valve seat to close the second control valve.

5. A fuel injector as claimed in claim 4, wherein the second control valve member is made of a resilient material.

6. A fuel injector as claimed in claim 3, wherein the second control valve member comprises an O-ring or a C-clip.

7. A fuel injector as claimed in claim 6, wherein the second control valve comprises an annular recess for locating the O-ring or the C-clip.

8. A fuel injector as claimed in claim 7, wherein an exit port is formed in the annular recess.

9. A fuel injector as claimed in claim 3, wherein the second control valve comprises a biasing means for biasing the second control valve member towards the second control valve seat to close the second control valve.

10. A fuel injector as claimed in claim 9, wherein the biasing means comprises a spring or a resilient member.

11. A fuel injector as claimed in claim 3, wherein the second control valve member consists of a ball valve member.

* * * * *